United States Patent [19]

Patton

[11] 4,330,453
[45] May 18, 1982

[54] POLYMERS CHARACTERIZED BY 1,3-IMIDAZOLIDINE-1,3-DIYL RINGS PLASTICIZED WITH ESTERS OF AROMATIC CARBOXYLIC ACIDS

[75] Inventor: Tad L. Patton, Baytown, Tex.

[73] Assignee: Exxon Research & Engineering Co., Florham Park, N.J.

[21] Appl. No.: 191,883

[22] Filed: Sep. 29, 1980

[51] Int. Cl.$^3$ .................. C08G 18/00; C08K 5/12
[52] U.S. Cl. .................. 524/294; 524/296; 524/298; 524/589; 528/44; 528/73
[58] Field of Search .......... 260/31.8 R, 31.8 W, 260/31.8 P; 528/44, 73

[56] References Cited

U.S. PATENT DOCUMENTS

| | | | |
|---|---|---|---|
| 3,645,978 | 2/1972 | Craven | 528/44 |
| 4,111,918 | 9/1978 | Giesecke | 528/73 |
| 4,146,723 | 3/1979 | Findesen | 528/73 X |
| 4,181,789 | 1/1980 | Giesecke | 528/73 |
| 4,182,812 | 1/1980 | Zecher | 528/73 |

FOREIGN PATENT DOCUMENTS 2654347 6/1978 Fed. Rep. of Germany ........ 528/44

OTHER PUBLICATIONS

Encylopedia of Polymer Science and Tech., vol. 10, pp. 228–306, Wiley Interscience (NY), 1969.

*Primary Examiner*—C. A. Henderson
*Attorney, Agent, or Firm*—M. B. Kurtzman

[57] ABSTRACT

Normally intractable polymers of the structure:

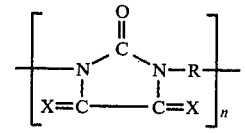

wherein Y is 0 or NH, provided at least one X is 0, such as poly(parabanic acids) are made extrudable by composition with from 10 to 60 weight percent of an ester of aromatic (carboxylic acid).

28 Claims, No Drawings

POLYMERS CHARACTERIZED BY 1,3-IMIDAZOLIDINE-1,3-DIYL RINGS PLASTICIZED WITH ESTERS OF AROMATIC CARBOXYLIC ACIDS

BACKGROUND OF THE INVENTION

1. Field of the Invention

The present invention relates to the discovery of a specific class of plasticizers for poly(iminoimidazolidinediones) and poly(parabanic acid) resins.

Prior Art

Both the poly(iminoimidazolidinediones) and poly(parabanic acids) and their methods of preparation are known and described in detail in commonly assigned U.S. Pat. No. 3,661,859, which is incorporated in its entirety herein. The poly(parabanic acids) may also be prepared by other processes, such as shown in U.S. Pat. No. 3,609,113.

The poly(iminoimidazolidinediones) may be formed by the reaction of hydrogen cyanide with a diisocyanate or mixture of diisocynates, the reaction of a dicyanoformamide with a diisocyanate or mixtures of diisocyanates, or the polymerization of a cyanoformamidyl isocyanate and contain a 1,3-imidazolidinedione-1,3- diyl ring of the following structures in the repeat units:

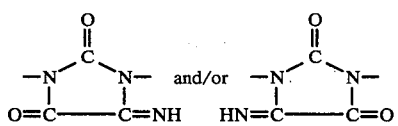

wherein NH is in the 4 or 5 position.

The poly(parabanic acids) also designated as poly(1,3-imidazolidine-2,4,5-triones) may be prepared, for example, by the acid hydrolysis of poly(iminoimidazolidinediones) and contain the imidazolidinetrione ring in the repeat unit:

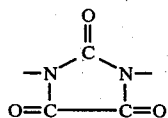

U.S. Pat. No. 3,609,113 and German Pat. No. 1,770,146 describe other methods for preparing polymers which contain the poly(parabanic acid) ring.

The polymers may contain both imino-1,3-imidazolidinedione-1,3-diyl rings and imidazolidinetrione rings, thus the present polymers may be broadly characterized as having the repeating unit:

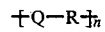

wherein Q is

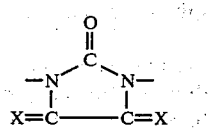

wherein X is O or NH, provided that at least one X is O, R is an organic moiety which may be aliphatic, alicyclic, aromatic or mixtures thereof, and n is sufficiently large to produce a solid product.

The R is the organic moiety of the diisocyanate when the polymer is produced according to the procedure in U.S. Pat. No. 3,661,859. Thus, the diisocyanates may be selected from a broad group having a large variety of organic moieties. The organic moieties of the diisocyanate may be substituted with groups such as alkyl, aryl, halogens, sulfoxy, sulfonyl, alkoxy, aryloxy, oxo, ester, alkylthio, arylthio, nitro and the like which do not react with the isocyanate group. Functional groups which have active hydrogen atoms, (e.g., carboxylic acids, phenols, amines, etc.) should not be present. Specific diisocyanates which may be used are set out in U.S. Pat. No. 3,661,859, other patents, articles or organic textbooks as known in the art.

Some of the parabanic acid polymers have been found to have high glass transition temperatures, and thus are especially suitable as magnetic tapes (where good dimensional stability at high temperatures is required), films for use in flexible printed circuits, cable wraps, etc., for fibers such as tire cord fibers (where tensile strength and modulus are required), for moldings for electrical connectors, bearings, magnetic wire insulation, coatings for cables, cookware, glass fabrics, industrial belts (where high temperatures are required) and the like.

However, many of the present polymers decompose when they are heated at or above their glass transition temperatures and as a result they can not be molded or extruded. Previously these polymers could be processed only by solution methods or by a powder coating technique which also requires a solvent.

It is an advantage of the compositions of the present invention that the poly(iminoimidazolidinediones), poly(imidazolidine-2,4,5-tiones) or mixed poly(iminoimidazolidine-1,3-dione/imidazolidine-2,4,5-triones) or as defined above the polymers

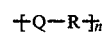

may be processed by extrusion and molding techniques, when plasticized according to the present invention. Also films of the compositions of the present invention can be heat-sealed whereas films of the same pure polymers can not be sealed with heat.

SUMMARY OF THE INVENTION

Briefly, the present invention is a stable meltable composition comprising heterocyclic polymers characterized in the repeating unit by the tri-substituted 1,3-imidazolidine-1,3-diyl ring:

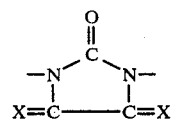

wherein X=O or NH, provided at least one X is O or more specially polymers having the repeating unit:

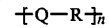

wherein Q is

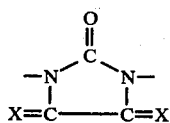

and X has the significance set out above, R is an organic moeity which may be aliphatic, alicyclic, aromatic or mixtures thereof and n is sufficiently large to produce a solid product and a plasticizing amount of an ester of an aromatic poly(carboxylic acid).

More particularly, the polymers may be poly(iminoimidazolidinediones) characterized by a tri-substituted 1,3-imidazolidine-1,3-diyl ring of the following structure:

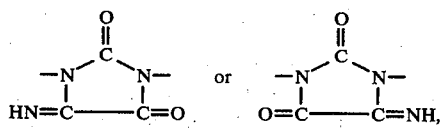

poly(parabanic acids) characterized by a tri-substituted 1,3-imidazolidine-1,3-diyl ring of the following structure:

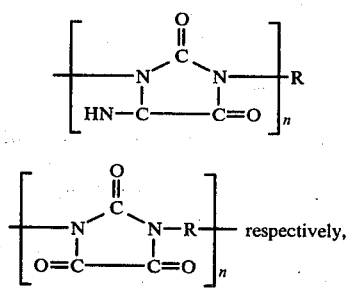

wherein R and n have the significance given above.

The plasticized compositions of the present invention are capable of being melted without decomposition. The polymers may be films, powders or the like.

The term "plasticizing amount" as used herein means that amount of designated esters, (1) which is incorporated in and compatible with the polymer to form a homogeneous composition or (2) which is applied on a surface of the polymer and which will allow the polymer to melt without decomposition. Generally, the plasticizer incorporated into the polymer will comprise from 10 to 50 weight percent of the total weight of polymer and plasticizer, although the plasticizers may be used in slightly smaller amounts, i.e., about 5% and in somewhat larger amounts, e.g., up to about 60%. These compositions may be further characterized as "extrudable". Films of these compositions can be sealed by heating.

DETAILED DESCRIPTION OF THE INVENTION

It was found that conventional plasticizers such as mixtures of N-ethyl-o-toluene sulfonamide and N-ethyl-p-toluene sulfonamide and mixtures of o-toluene sulfonamide and p-toluene sulfonamide were not useful for plasticizing the present polymers. Generally, the compositions containing these plasticizers melted but were subject to decomposition at the temperatures required to melt the blends if normal mixing procedures were used, i.e., adequate blending time of the polymer and plasticizer. Those blends which were melted in small batches for only a few minutes exhibited poor thermal stability when heating and mixing were continued.

These problems are substantially overcome by the use of the specified esters of aromatic poly(carboxylic acids) as plasticizers according to the present invention. The numerous references in the prior art to the use of the multitude of esters as plasticizers, e.g., Encyclopedia of Polymer Science & Technology, Vol. 10 pp 228-306, Wiley-Interscience, NY 1969 are of no value since neither the esters of aliphatic or alicyclic acids are soluble in the present polymers.

Preferred ester plasticizers are those of the structure:

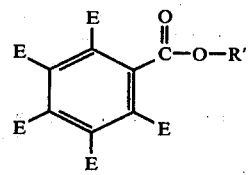

wherein E is

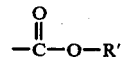

or H provided at least one E is

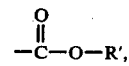

and R' is a radical independently selected from methyl, ethyl, phenyl, tolyl, benzyl or acetoxyethyl, mixtures thereof and mixtures of at least 50 weight percent thereof with compounds of the structure:

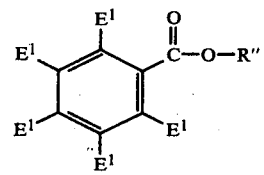

wherein $E^1$ is

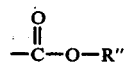

or H, provided at least one $E^1$ is

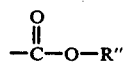

and R" is an aliphatic radical having 3 to 13 carbon atoms.

Some illustrative preferred esters are dimethyl terephthalate, dimethyl isophthalate, dimethyl phthalate, diethyl terephthalate, diethyl isophthalate, diethyl phthalate, ethyl methyl terphthalate, ethyl methyl isophthalate, ethyl methyl phthalate, diphenyl isophthalate, diphenyl phthalate, ditolyl phthalate, dibenzyl phthalate, trimethyl trimellitate, tetramethyl pyromellitate, tetraethyl pyromellitate, bis(acetoxyethyl) terephthalate, mixtures of any of the above with each other at least weight percent thereof in admixture with dipropyl phthalate, diisodecyl phthalate, ditridecyl phthalate, dihexyl phthalate, diisononyl phthalate, diisoamyl terphthalate and the like.

The esters of aromatic poly(carboxylic acids) may have substituents which do not inhibit the plasticizing effect of the material. In particular, substituent groups which have active hydrogen atoms, (e.g., carboxylic acids, phenols, amines, etc.) should not be present. Examples of substituent groups which do not interfere with plasticizing effect include halogens, such as bromine, chlorine and fluorine nitro-groups, aryloxy or alkoxy groups, and sulfur containing groups.

The presence of a plasticizer in the polymers described herein will, as is the known effect of plasticizers, result in different film properties at elevated temperatures, compared to unplasticized polymer film, that is, polymer films not containing plasticizer. Generally, plasticizers are incorporated in the polymer in amounts of about 10 to 30 weight percent which will produce lower softening points than the polymer without the plasticizer incorporated therein.

The plasticized polymer is thus desirably softened at high temperatures so that films of these compositions may be sealed by heat. In the case of the present polymers which have high glass transition temperatures it may not always be desirable to give up the high temperature properties. For example, a cast film is just as easily produced without plasticizers, and may be more easily produced without plasticizers, if solvent removal is hampered by film sag or melting during solvent evaporation.

Films of the present unplasticized polymers are however difficult to heat seal because of their very high softening temperatures, because the polymer does not flow enough to coalesce into a single phase. Moreover, other materials employed in conjunction with the polymer may be damaged by the high temperature required to seal the unplasticized polymer.

Accordingly it has been found that application of a plasticizer described herein as a thin coating to the surface of the unplasticized polymer, such as a film, results in the lowering of the softening point of the treated surface of the polymer to such a degree as to make the film heat sealable. For example, the treated surface may be applied to an untreated surface of the same or different polymeric material and laminated thereto by heat and pressure. This method of heat sealing has a definite advantage over the use of lower melting adhesives, since the melting point of the adhesive may limit the maximum use temperature of the film. This method of heat sealing is also superior to that wherein the plasticizer is distributed throughout the film because less plasticizer per pound of polymer is required and the heat sealed product will retain its mechanical properties at higher temperatures.

Only one surface of a film to be heat sealed need have the plasticizer applied, that is the surface which is to be contacted with another surface must have the plasticizer thereon, however if a coated surface of the present polymer film were placed in contact with the uncoated surface of another film of the present polymer or with its own uncoated surface (as in cable wrapping) the softening point of the polymer in both film surfaces is reduced. The sealing is preferably accomplished by heat and pressure, such that the polymer on both surfaces contacts the plasticizer so that they both soften and coalesce into a single film. Thus, the two films would be joined by fusion. This same procedure has been used to join polymer film to other materials such as copper foil. The thin coating of plasticizer may be applied from a solvent or a melt, to the entire surface to be sealed or to just an edge. The coating is preferably less than 15 mil, more preferably about 0.1 mil thick. Generally the thickness of such coating will be in the range of about 0.01 to 0.5 mil.

The solution method of applying the coating of plasticizer employs as a solvent any suitable volatile liquid which dissolves the present plasticizer and which does not affect the present polymers. For example, suitable solvents include low molecular weight alkanols having about 1 to 6 carbon atoms, low molecular weight ketones having about 3 to 6 carbon atoms, $C_5$ to $C_7$ alkane hydrocarbons, aromatic hydrocarbons having 6 to 8 carbon atoms, halogenated analogues of the above and the like. Such compounds as would be suitable are methanol, ethanol, propanol, 2-butanol, tertiary butanol, 2-3,dimethyl 2-butanol, 2 methyl 2-butanol, 3-pentanol, acetone, methyl ethyl ketone, methyl propyl ketone, butyl methyl ketone, 2-methyl-4-pentanone, methyl acetate, ethyl acetate, isobutyl acetate, isobutyl formate, isopropyl formate, ethyl propionate, isopropyl propionate, pentane, hexane, heptane, toluene, benzene, xylene, naptha, chloroform, carbon tetrachloride, butyl chloride, methylene dichloride, ethyl bromide.

Within the very wide range of useful solvents disclosed, those having a boiling point in the range of 30° to 126° C. are preferred.

The plasticizer is employed in the solvent based on total weight of solvent and plasticizer in an amount in the range of 1 to 90 weight percent and more preferably from 5 to 50 weight percent. The solvent-plasticizer composition is applied to a film by coating it on the desired portion of the film and evaporating the solvent and heating the film to a temperature of 100° to 200° C. (several seconds to 5 minutes). The resultant coated film is not tacky and has substantially the same properties as uncoated film, except for the added property of heat sealability.

To form a heat sealed bond between the present polymer film bearing the coating of plasticizer and itself or a similar film or some other object, the coated surface is applied against the surface to be joined thereto and heat and pressure applied to form the bond.

Generally temperatures in the range of 200° to 300° C. are employed for forming heat seals and more preferably temperatures in the range of 240° to 275° C. are used. Preferably, pressure is applied in conjunction with the heat to facilitate the coalescing of the films. Usually pressures in the range of 1 to 100 psig are used. Conveniently, the pressure is applied by nip rolls, platens or any other conventional means of applying pressure such as the tightness of the film layers against itself on a wrapped wire.

The amount of plasticizer applied by coating as described is generally about 1 to 10 weight percent of the film onto which it is coated, but may be as little as 0.1 weight percent thereof and obtain the described heat sealing or as much as 25 weight percent without detriment. The relative weight of plasticizer to the film is determined in regard to the entire film thickness in the area covered by the plasticizer.

The polymer-plasticizer compositions according to the present invention may be extruded without degradation. The extrusions may be carried out at temperatures in the range of 250° to 330° C. The extrudates of the invention compositions were tough, smooth, clear and yellow to amber colored.

ILLUSTRATIVE PREFERRED EMBODIMENTS

For purposes of illustration, but not for exclusion, the majority of the examples illustrating the invention will be described in specific with respect to a particular polymer. That is, a polyparabanic acid prepared from diphenylmethane diisocyante in accordance with proprietary techniques well described in patents assigned to Exxon Research and Engineering Company to result in a high performance polymer having the repeating unit shown below:

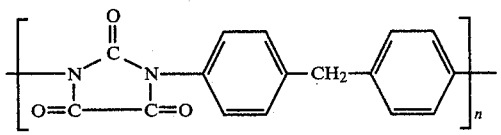

which is also designated as poly[1,4-phenylenemethylene-1, 4-phenylene-1,3-(imidazolidine-2,4,5-trione)] which is also designated in chemical abstracts as poly[(2,4,5-trioxo-1,3 imidazolidinediyl)-1,4-phenylenemethylene-1,4-phenylene]. It has a high glass transition temperature of 290° C. and can not be extruded or molded. The precursor polyiminoimidazolidinedione having the following repeating unit was also used for illustrating this invention:

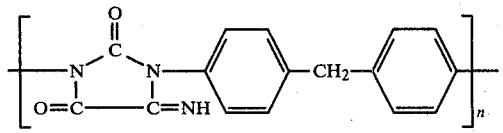

For purposes of convenience, these polymer species will be referred to as PPA-M and PIPA-M, respectively. It will be recognized that other polyparabanic acids (PPA) and their precursors (PIPA) can be prepared from other monomers so that the diphenyl methane group will be replaced by other organic moieties.

In general, the preferred polymers of the polymer-plasticizer compositions are those which have sufficient repeating units at room temperature to be solids.

In addition to the polymer and plasticizers, it is contemplated that other appropriate additives which are not detrimental to the compositions such as those employed to stabilize against oxidation or ultraviolet light, flame retardants, pigments, fillers and the like may be present.

The following examples illustrate the present invention and should not be construed as limiting the scope thereof:

EXAMPLES

The inherent viscosities ($\eta$inh) in these examples were determined in an Ubbelohde tube at 25° C. using a concentration of 0.5 g. of polymer in 100 ml. dimethylformamide.

The Brabender extruder which was used had a 0.75 inch barrel with an L/D ratio of 20:1. It was fitted with either a ⅛ inch heated rod die or a heated 2" wide adjustable thickness ribbon die. The barrel had two heated zones. The screw had 10 flights feed, 5 flights compression, and 5 flights metering. The compression ratio was 3:1.

All polymer powders used in these examples were dry.

EXAMPLES 1–4

PPA-M blends containing 20% weight of the indicated plasticizer. The blends were prepared in a Waring blender then mixed in the mixing head of a Brabender Plasticorder at 290° C. using a rotor speed of 40 rpm. The specific compositions are summarized in TABLE I.

The extrudates were pelletized and the thermogravimetric analysis curve of a pellet from each blend was obtained. The temperature at which a 5% weight loss occurred was noted in TABLE I.

TABLE I

| Ex. | Plasticizer[a] | Extruder Temp., °C. Zone[1] | Zone[2] | Die | Screw, rpm | TGA[b] −5 Wt. % |
|---|---|---|---|---|---|---|
| 1 | Dimethyl terephthalate | 280 | 270 | 260 | 50 | 298° C. |
| 2 | Dimethyl isophthalate | 280 | 270 | 250 | 40 | 315° C. |
| 3 | Diethyl phthalate | 280 | 260 | 250 | 40 | 328° C. |
| 4 | Diphenyl phthalate | 300 | 290 | 280 | 30 | 352° C. |

[a]The PPA-M ($\eta$inh = 1) blends contained 20 Wt. % of the designated plasticizer. The extruder on a Brabender Prep Center had a ¾ inch barrel with an L/D ratio of 20:1. It was fitted with a ⅛ inch heated rod die. The barrel was heated in two zones. The screw had 10 flights feed, 5 flights compression, and 5 flights metering. The compression ratio was 3:1.
[b]The TGA (thermogravimetric analysis) curves were determined in a $N_2$ atmosphere at a heating rate of 10° C. per minute. The instrument was a Perkin-Elmer TGS-1 thermobalance.

EXAMPLES 5–13

In these examples the PPA-M polymer was blended with various aromatic ester plasticizer at 15 Wt. % plasticizer and evaluated for stability by determining how long was required for melt to turn to an infusable powder at 290° C. It would be considered that 10 minutes would be lowest acceptable period in order to allow sufficient time for blending and fabrication using the plasticized polymer. The conditions and results are reported in TABLE II.

TABLE II

| Ex. | Plasticizer (15 Wt. %)[a] | Decomposition,[b] Minutes |
|---|---|---|
| 5 | Dimethyl terephthalate | 15 |
| 6 | Dimethyl isophthalate | 15 |
| 7 | Dimethyl phthalate | 20 |
| 8 | Diethyl phthalate | 45 |
| 9 | Diphenyl phthalate | 33 |
| 10 | Trimethyl trimellitate | 30 |
| 11 | Trimethyl trimesate | No melt |
| 12 | Tetramethyl pyromellitate | 45 |
| 13 | Bis(acetoxyethyl) terephthalate | 30 |

[a]The blends were heated in the mixing head of the Brabender plasticorder on the Prep Center. The rotors turned at 40 rpm at a temperature of 290° C.
[b]This is the time required for the homogeneous melt to change to an infusible powder. No evidence of decomposition nor change to a powder was observable until the last 2–5 minutes of the times indicated.

EXAMPLES 14–28

In these examples the effect of chain length of the R and $R^1$ groups of the esters were evaluated by blending the indicated plasticizer with PPA-M at 290° C. in a Plasticorder. The results are summarized in TABLE III. Normally the PPA-M polymer powders have strong static charges however, blends of acceptable plasticizers (those that formed melts with PPA-M, and those having long $R^1$ alkyl radicals did not have static charges. The blends were prepared in a Brabender Plasticorder at 290° C. at 40 rpm for 5 minutes. Those evaluated for static charge were ground in a Wiley Mill and the adhesion of the powder in the mill observed.

TABLE III

| Ex. | Plasticizer | Wt. % | Formation Melt | Static Charge |
|---|---|---|---|---|
| 14 | diethyl phthalate | 20 | yes | yes |
| 15 | dipropyl phthalate | 20 | no | — |
| 16 | dioctyl phthalate | 20 | no | — |
| 17 | dihexyl phthalate | 15 | no | — |
| 18 | diisononyl phthalate | 15 | no | — |
| 19 | ditridecyl phthalate | 15 | no | — |
| 20 | diisodecyl phthalate | 15 | no | — |
| 21 | dihexyl phthalate diethyl phthalate | 8.3 25 | yes | no |
| 22 | diisononyl phthalate diethyl phthalate | 8.3 25 | yes | no |
| 23 | ditridecyl phthalate diethyl phthalate | 8.3 25 | yes | no |
| 24 | diisodecyl phthalate diethyl phthalate | 0.67 25 | yes | yes |
| 25 | diisodecyl phthalate diethyl phthalate | 1.30 25 | yes | yes |
| 26 | diisodecyl phthalate diethyl phthalate | 2.70 25 | yes | no |
| 27 | diisodecyl phthalate diethyl phthalate | 5.40 25 | yes | no |
| 28 | diisodecyl phthalate diethyl phthalate | 8.30 25 | yes | no |

EXAMPLES 29–36

Blends of PPA-M with diethyl phthalate and dibenzyl phthalate were prepared at various levels of plasticizer and evaluated for decomposition. The conditions of blending and the test results are set out in TABLE IV.

TABLE IV

| Ex. | Plasticizer[a] | Wt. % | Decomposition, Minutes |
|---|---|---|---|
| 29 | Diethyl phthalate | 5 | 7 |
| 30 | Diethyl phthalate | 10 | 10 |
| 31 | Diethyl phthalate | 15 | 17 |
| 32 | Diethyl phthalate | 20 | 24 |
| 33 | Dibenzyl phthalate | 10 | 18.5 |
| 34 | Dibenzyl phthalate | 15 | 45 |
| 35 | Dibenzyl phthalate | 20 | 105 |
| 36 | Dibenzyl phthalate | 5 | 12 |

[a]The blends were heated in the mixing head of the Brabender plasticorder on the Prep Center. The rotors turned at 85 rpm at a temperature of 300° C.
[b]This is the time required for a homogeneous melt to change an infusible powder. No evidence of decomposition nor change to a powder was observable until the last 2–5 minutes of the time indicated.

EXAMPLES 37–42

Films of PPA-M which contained a plasticizer and copper/UV-284 (stabilizer system) were cast from dimethyl formamide. Strips of each film (1.3 to 1.6 mils thick) were cut ⅜" wide. Each strip was wrapped around an 8 inch long section of ¼ inch OD copper tubing which had been cleaned with soap and water and acetone then dried. The film wrappings were overlapped about 50%. The wrapped sections of tubing were then put in a 260° C. oven for 5 minutes to heat seal. After removing the wrapped tubes from the oven, the wrappings were examined to determine if they heat sealed and if they adhered to the copper. The results are shown in TABLE V. Normally, PPA-M will not soften sufficiently to heat seal cast films thereof; as shown in TABLE V the plasticizer incorporated into the cast films made them heat sealable.

The Cu/UV 284 is a chelate of cupric ion with 2-hydroxy-4-methoxy-benzophenone-5-sulfonic acid (copper 2-hydroxy-4-methoxy-5-sulfo-benzophenone).

TABLE V

| Ex.[a] | Plasticizer | Wt. % | Heat Seal | Adhesion to Copper[c] |
|---|---|---|---|---|
| 37 | Diethyl phthalate | 15 | good | slight |
| 38 | Dimethyl phthalate | 15 | good | slight |
| 39 | Dipropyl phthalate | 15 | good | good |
| 40 | Diphenyl phthalate | 15 | good | good |
| 41 | Diisodecyl phthalate | 4.9 | no | no |
| 42 | No plasticizer | | no | no |

[a]Films were stabilized with Cu/UV-284 (0.5% concentration).
[b]"Good" heat seals could not be unwrapped without tearing.
[c]"Good" adhesion means the film wrappings could not be removed from the copper tubing.

The invention claimed is:

1. A stable meltable composition comprising heterocyclic polymers having the repeating unit:

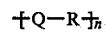

wherein Q is

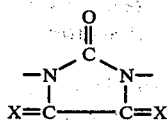

X=O or NH, provided at least one X is O, R is an organic moiety which may be aliphatic, alicyclic, aromatic or mixtures thereof and n is sufficiently large to produce a solid product and a plasticizing amount of an ester of an aromatic poly(carboxylic acid) having the structure:

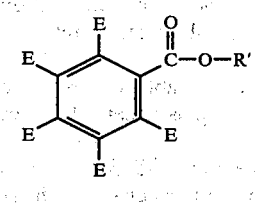

wherein E is

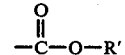

or H, provided at least one E is

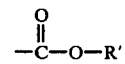

and R' is a radical independently selected from methyl, ethyl, phenyl, tolyl, benzyl or acetyoxyethyl, mixtures thereof and mixtures of at least 50 weight percent thereof with compounds of the structure:

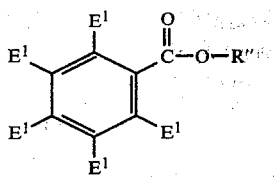

wherein $E^1$ is

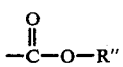

or H, provided at least one $E^1$ is

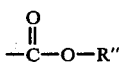

and R" is an aliphatic radical having 3 to 13 carbon atoms.

2. The stable meltable composition according to claim 1 wherein said plasticizer is present in an amount of from 5 to 60 weight percent based on the total weight of polymer and plasticizer.

3. The stable meltable composition according to claim 2 wherein from 10 to 50 weight percent of plasticizer is present.

4. The stable meltable composition according to claim 1 wherein the plasticizer is dimethyl terephthalate.

5. The stable meltable composition according to claim 1 wherein the plasticizer is dimethyl isophthalate.

6. The stable meltable composition according to claim 1 wherein the plasticizer is diethyl phthalate.

7. The stable meltable composition according to claim 1 wherein the plasticizer is diphenyl phthalate.

8. The stable meltable composition according to claim 1 wherein the plasticizer is dimethyl phthalate.

9. The stable meltable composition according to claim 1 wherein the plasticizer is trimethyl trimellitate.

10. The stable meltable composition according to claim 1 wherein the plasticizer is tetramethyl pyromellitate.

11. The stable meltable composition according to claim 1 wherein the plasticizer is bis(acetoxyethyl) terephthalate.

12. The stable meltable composition according to claim 1 wherein the plasticizer is dibenzyl phthalate.

13. The stable meltable composition according to claim 1 wherein the plasticizer is a mixture of diethyl phthalate and diisodecyl phthalate.

14. The stable meltable composition according to claim 1 wherein the plasticizer is a mixture of diethyl phthalate and ditridecyl phthalate.

15. The stable meltable composition according to claim 1 wherein the plasticizer is a mixture of diethyl phthalate and dihexyl phthalate.

16. The stable meltable composition according to claim 1 wherein the plasticizer is a mixture of diethyl phthalate and diisononyl phthalate.

17. The stable meltable composition according to claim 1 wherein the polymer has the structure:

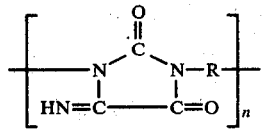

18. The stable meltable composition according to claim 1 wherein the polymer has the structure:

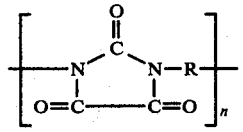

19. The stable meltable composition according to claim 17 or 18 wherein the R group is methylenediphenyl.

20. The stable meltable composition according to claims 17 or 18 wherein the R group is oxydiphenyl.

21. The stable meltable composition according to claims 17 or 18 wherein the R group is a mixture of methylenediphenyl and 2,4-tolylenediyl groups.

22. The stable meltable composition according to claims 17 or 18 wherein the R group is a mixture of methylenediphenyl and bitolyenediyl groups.

23. The stable meltable composition of either claims 1, 17 or 18 wherein said plasticizer is incorporated into said polymer.

24. The stable meltable composition according to claim 23 wherein said polymer is a film.

25. The meltable composition of either claims 1, 17 or 18 wherein said plasticizer is coated onto a surface of said polymer.

26. The stable meltable composition according to claim 25 wherein said polymer is a film.

27. The stable meltable composition according to claim 26 wherein said plasticizer is coated in a thickness of from about 0.01 to 0.5 mil.

28. The stable meltable composition according to claim 23 wherein said polymer is a powder.

* * * * *